Nov. 8, 1938.  R. H. DAISLEY  2,135,966

ENGINE VALVE

Filed Aug. 25, 1937

INVENTOR.
ROBERT H. DAISLEY
BY
Kwis, Hudson & Kent
ATTORNEYS.

Patented Nov. 8, 1938

2,135,966

UNITED STATES PATENT OFFICE 2,135,966

ENGINE VALVE

Robert H. Daisley, Birmingham, Mich., assignor to Eaton Manufacturing Company, Cleveland, Ohio, a corporation of Ohio Application August 25, 1937, Serial No. 160,859

1 Claim. (Cl. 123—188)

This invention relates to engine valves and more particularly to a valve of the type used in internal combustion engines.

In the manufacture of valves for internal combustion engines, it has become the practice to treat the stems by a nitriding process to increase their hardness and resistance to wear, and scuffing in the vicinity of travel in the valve guide. This treatment has been applied to exhaust valves made of alloyed steel, and particularly to valves of this type intended for use in aviation engines. It has been found, however, that the advantages afforded by the nitriding treatment are, in part, offset by the fact that valves so treated are more susceptible to corrosion and pitting, particularly at and adjacent the section of the valve stem which enters the guide and which is subjected to relatively high temperatures during the operation of the engine. Corroding and pitting of the valve stems at this point is very detrimental and undesirable because it not only weakens the valve stem, at this point, but reduces the area of bearing contact with the guide, which results in increased friction and wear between the stem and guide and in reduced heat conductivity between the stem and guide. By the present invention, as will be explained more in detail hereinafter, I overcome these disadvantages by providing the stem of an engine valve with a section at and adjacent the guide opening which is highly resistant to corrosion.

It may, therefore, be said to be an object of the present invention to provide a novel internal combustion engine valve having corrosion-resisting alloy integrally bonded to the stem thereof, which enables the stem to resist pitting and corrosion.

Another object of my invention is to provide a novel internal combustion engine valve having a layer or covering of corrosion-resisting alloy disposed in an annular recess of the stem and bonded thereto, whereby the stem is adapted to operate efficiently in a valve guide and with maximum effective bearing surface and thermal conductivity.

Other objects and advantages of the invention will be apparent from the following description when taken in conjunction with the accompanying sheet of drawings, in which—

Figure 1:
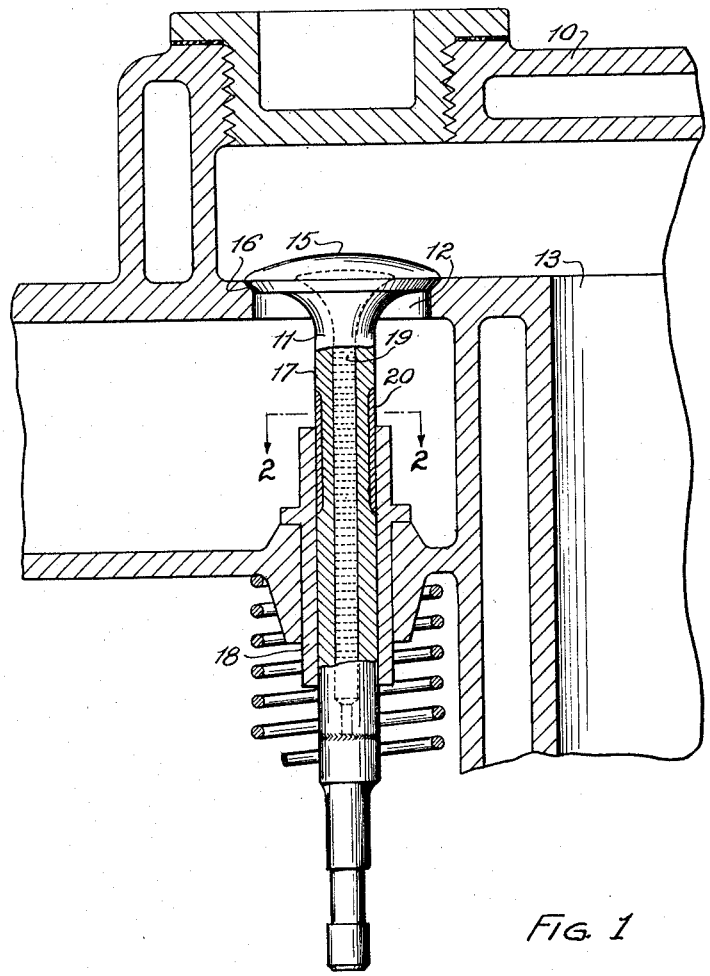
Figure 2:
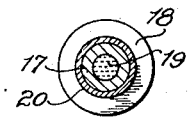

Fig. 1 is a partial sectional view of an internal combustion engine embodying the novel valve of my invention; and Fig. 2 is a transverse sectional view taken through the stem of the valve as indicated by line 2—2 of Fig. 1.

More detailed reference will now be made to the drawing for the purpose of describing my novel engine valve and, although the drawing illustrates but one embodiment, it will be understood, of course, that the invention is susceptible of variation in its manner of application and may be embodied in various other engine valves.

In Fig. 1 of the drawing, I show a portion of an engine block 10, which may be the block of an aviation engine, and a valve 11 of my novel construction in operative position in the engine block for controlling the port 12 of the cylinder 13. The valve 11 may be an exhaust valve, in which case the port 12 would be an exhaust port, although the invention may, if desired, be also applied to intake valves.

The valve 11 comprises a head 15 which cooperates with an annular seat 16 for controlling the port 12, and a stem 17 which is adapted for reciprocable sliding movement in a hollow valve guide 18 having its axis aligned substantially with the axis of the port 12. The valve shown in this instance is one of the type having a chamber 19 in the head and stem thereof containing a quantity of metallic sodium, although the invention may be applied to various other valves, of both the solid and hollow type.

To reduce or eliminate the corrosion or pitting of the stem of the valve, at and adjacent the upper end of the guide 18, I provide this section of the stem with an annnular covering or layer 20 of an alloy which is highly resistant to corrosion. This covering may be in the form of a sleeve or inlay which may be applied to the valve stem by first forming an annular recess or depression of approximately one-sixteenth of an inch in depth in the section of the stem to be treated, that is to say, in a section of the stem which may be from one-quarter of an inch to one inch in length and located relative to the head so that a portion of the section will extend into the upper end of the guide when the valve is fully open. The alloy which forms the covering may be applied to the valve stem in any suitable manner, as by means of a suitable welding operation in which a quantity of the alloy is caused to fill the annular depression and to be integrally bonded to the metal of the valve stem. After the welding operation, the covering 20 may be machined or otherwise surfaced to the desired size and finish, with the surface of the covering substantially flush with the adjacent other portions of the valve stem.

Various different alloys may be used as the corrosion resisting alloy which forms the covering 20. For example, I may use, for this purpose, an alloy of approximately the following composition:

| | Per cent |
|---|---|
| Cobalt | 43 |
| Chromium | 29–34 |
| Molybdenum | 11–14 |
| Other elements (maximum) | 9 |

Another alloy, similar to that provided by the above analysis, but of a somewhat harder characteristic, may be used for the covering 20 if desired. This relatively harder alloy may be of the following composition:

| | Per cent |
|---|---|
| Cobalt | 55 |
| Chromium | 27–33 |
| Molybdenum | 3–6 |
| Other elements (maximum) | 7.5 |

From the foregoing description and accompanying drawing, it will now be readily seen that I have provided a novel engine valve having a stem which is provided, for a portion or section of its length, with an annular cover or layer of corrosion-resisting alloy. This layer or cover resists corrosion or pitting of the stem adjacent and above the upper end of the valve guide, and thereby reduces wear and maintains this section of the valve stem in a smooth and clean condition for operation in the guide with minimum friction and maximum surface contact for heat conduction.

While I have illustrated and described my novel engine valve in a somewhat detailed manner, it will be understood, of course, that I do not wish to be limited to the precise construction and manner of use herein disclosed, but regard my invention as including such changes and modifications as do not constitute a departure from the spirit of the invention and scope of the appended claim.

Having thus described my invention, I claim:

An engine valve having a head and a stem connected with the head and adapted for reciprocation in a hollow guide, said stem having an annular recess in its surface at a point spaced from said head and containing a sleeve of corrosion resisting alloy integrally bonded to the stem with its surface substantially flush with the surface of adjacent portions of the stem, and extending beyond the guide when the valve is in closed position said sleeve being of a length and location relative to the head such that when the valve is fully open the lower end of the sleeve extends into the guide and the remainder of the sleeve projects from the guide to protect the portion of the valve stem thereabove.

ROBERT H. DAISLEY.